United States Patent [19]

Kazumi et al.

[11] 4,413,709

[45] * Nov. 8, 1983

[54] CONSTANT-SPEED CONVEYOR APPARATUS

[75] Inventors: Ozawa Kazumi, Koga; No Shinichiro, Hooya, both of Japan

[73] Assignee: Kabushiki Kaisha Yakult Honsha, Tokyo, Japan

[ * ] Notice: The portion of the term of this patent subsequent to Feb. 1, 2000 has been disclaimed.

[21] Appl. No.: 253,757

[22] PCT Filed: Aug. 22, 1980

[86] PCT No.: PCT/JP80/00194

§ 371 Date: Apr. 13, 1981

§ 102(e) Date: Apr. 13, 1981

[87] PCT Pub. No.: WO81/00553

PCT Pub. Date: Mar. 5, 1981

[30] Foreign Application Priority Data

Aug. 24, 1979 [JP] Japan ................. 54-107177

[51] Int. Cl.³ .............................................. B65G 17/16
[52] U.S. Cl. ..................................... 198/344; 198/377
[58] Field of Search ............... 198/344, 377, 378, 480, 198/612, 803; 414/744 R; 101/38 R, 38 A, 39, 40

[56] References Cited

U.S. PATENT DOCUMENTS

| | | | |
|---|---|---|---|
| 2,725,063 | 11/1955 | Huffman | 198/377 X |
| 2,881,563 | 4/1959 | Upton et al. | 198/377 X |
| 3,659,694 | 5/1972 | Harris . | |
| 3,777,703 | 12/1973 | Gillie | 198/377 X |

FOREIGN PATENT DOCUMENTS

| | | |
|---|---|---|
| 49-19664 | 5/1974 | Japan . |
| 50-117515 | 2/1975 | Japan . |
| 51-104910 | 9/1976 | Japan . |

Primary Examiner—E. R. Kazenske
Assistant Examiner—Douglas D. Watts
Attorney, Agent, or Firm—Birch, Stewart, Kolasch & Birch

[57] ABSTRACT

A conveyor unit used for conveying objects along a predetermined conveying locus of an irregular shape at a constant speed. The conveyor unit is characterized by that it meets the following requirements:

(1) Bearings are mounted on the outer periphery of a rotary disk and a rotating shaft is fitted in each of the bearings, the shaft having an arm of an article support slidably fitted therein;

(2) A conveyor chain is provided which is adapted to move along a conveying locus or path of a predetermined irregular shape controlled by inner cams and outer cams and which is connected with a connecting member of the article support;

(3) A rotating shaft of a sprocket to drive the conveyor chain is arranged to rotate in synchronism with a rotating shaft to drive the rotary disk.

Since the conveyor unit according to the present invention meets the above-mentioned three requirements, it is possible to move objects (or articles) to be conveyed along a predetermined conveying locus of an irregular shape at a constant speed by actuating the conveyor unit. Therefore, for example, in the cases where the articles to be conveyed are containers for something to eat and drink, medical supplies, cosmetics and various kinds of materials, by disposing along the conveying locus various kinds of processing devices such as (a) content charging or filling devices, (b) container capper and sealer apparatus, (c) container's outer surface printing and labelling devices etc., it is possible to effect product processing steps continuously and in the form of an integrated work.

3 Claims, 3 Drawing Figures

CONSTANT-SPEED CONVEYOR APPARATUS

BACKGROUND AND FIELD OF THE INVENTION

This invention relates to an apparatus for conveying articles along a conveying locus or path of a predetermined irregular shape at a constant speed.

In various kinds of article working processes in factories in a variety of technical fields, a great many apparatuses for conveying articles along a circular conveying locus or path at a constant speed have heretofore been employed. However, no apparatus for conveying articles along a conveying locus or path of a predetermined irregular shape has been known.

We have made various close studies to develop an apparatus for conveying articles along a conveying locus of a predetermined irregular shape at a constant speed which is essential for effecting various kinds of article working or production processes continuously and efficiently in a variety of factories and we have succeeded in obtaining a conveyor apparatus according to the present invention which is capable of accomplishing such an object.

Accordingly, the present invention provides an apparatus for conveying articles along a conveying locus or path of a predetermined irregular shape at a constant speed.

The chains which have been employed as one of the means for transmitting motive power in various kinds of machines or production systems have advantageous characteristics for use as constant-speed conveyor units of articles because the locus of movement thereof can be set substantially as desired. Aiming at and making the best use of this characteristic feature of chains, we have devised a conveying apparatus of the present invention which can be moved by a conveyor chain or belt which moves along a conveying locus or path of a predetermined irregular shape wherein means is provided separately for carrying or supporting the articles to be conveyed.

DETAILED DESCRIPTION

The present invention will be described in detail below by way of example only with reference to the accompanying drawings.

In accordance with the present invention, there is provided an apparatus for conveying articles at a constant speed characterized by that it comprises a rotary disk 1 having a plurality of bearings 5 mounted on the outer periphery thereof and a rotary shaft 11 for rotating the disk, a plurality of article support means 3 each having an arm 3b and a connecting member 3c, freely rotatable shafts 4 each adapted to be fitted in one of the bearings 5, said arm 3b being arranged to be slidably fitted into the shaft 4, a conveyor chain 6 arranged to be moved along a conveying locus or path of a predetermined irregular shape regulated or controlled by inner cams 7 and outer cams 8, said conveyor chain 6 being connected with the connecting member 3c, a sprocket 2 adapted to drive said conveyor chain 6 and having a rotating shaft 22, the rotating shaft 11 of the rotary disk 1 being arranged to rotate in synchronism with the rotating shaft 22 of the sprocket 2.

When the constant speed conveyor apparatus of the present invention is rendered operative, the rotation of the rotary disk 1 causes the bearings 5 mounted on the outer periphery thereof to make circular motion while rotation of the shaft 22 of the sprocket 2 in synchronism with that of the shaft 11 causes the conveyor chain 6 to move along a conveying locus of a predetermined irregular configuration under the control of the inner cams 7 and the outer cams 8.

As aforementioned, since the rotating shaft 4 having the arm 3b slidably fitted therein is rotatably fitted in the bearing 5, the article support means 3 will basically be moved by the circular motion of the bearing 5. Because the connecting member 3c is connected with the conveyor chain 6, the article support means 3 will ultimately move along the locus or path of movement of the conveyor chain 6. Thus, if a point in the article to be conveyed on the support means 3 is represented by P, the point P is allowed to move by the circular motion of the bearing 5, and will ultimately be moved by the conveyor chain 6 which moves along a locus of a predetermined irregular shape. Although, in this case, the locus of movement of the bearing 5 is different from that of the conveyor chain 6, the rotation of the shaft 4 together with the sliding movement of the arm 3b of the article support means 3 enables the point P to be freed from the basically circular motion and move always along the locus or path of movement of the conveyor chain 6 at the entirely same speed as that of the latter. In short, the article to be conveyed will be moved along a locus of a predetermined irregular shape while it is carried through the bearing 5 by the rotary disk 1. The method of connecting of connecting member 3c with the conveyor 6 is not limited to any specific method. It is preferable to provide the lower portion of the support means 3 with a downwardly protruding pin and allow the pin to be rotatably fitted into the shaft of a chain link of the conveyor chain 6.

It will be understood that by the term "chain" as employed herein is meant a non-sliding wrapping transmission means covering endless chains and belts which can be rotated in engagement with rotating members such as gears.

Each of the article support means 3 has an article holding member 3a which can take various suitable forms depending on the shape and material of the articles to be conveyed such as for example bottles, cans and plastic containers or the like.

The conveying locus of an irregular shape applicable to the constant speed conveyor chain of the present invention is not limited to the symmetrical form as illustrated in FIG. 2. Non-symmetrical conveying locus may also be set provided that the conveyor chain can be moved smoothly therealong.

INDUSTRIAL APPLICABILITY

One example in which the constant speed conveyor apparatus of the present invention is applied will be explained below.

Figure 1:
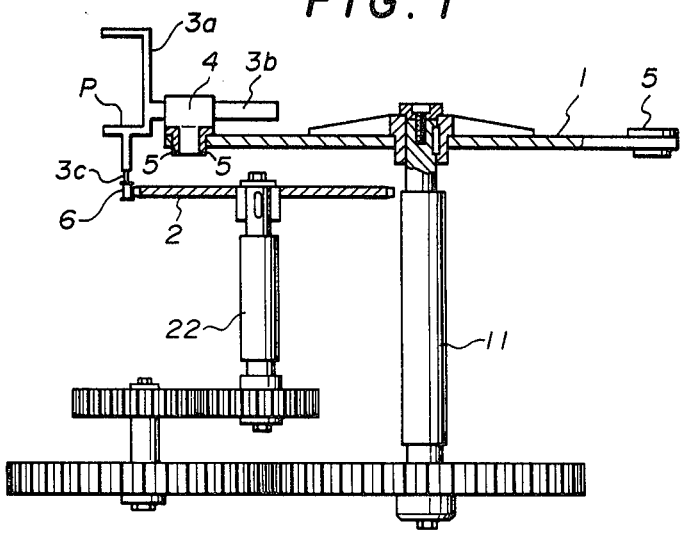
FIG. 1 is a fragmentary sectional view illustrating one embodiment of the constant speed conveyor apparatus according to the present invention.
Figure 2:
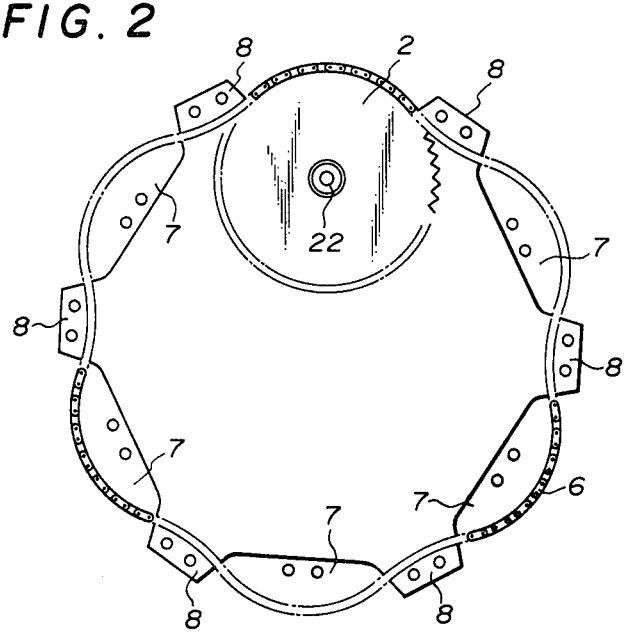
FIG. 2 shows one example of conveyor chain stretched so as to be moved along a locus or path of movement of a predetermined irregular shape which can be regulated or controlled by a plurality of inner and outer cams.
Figure 3:
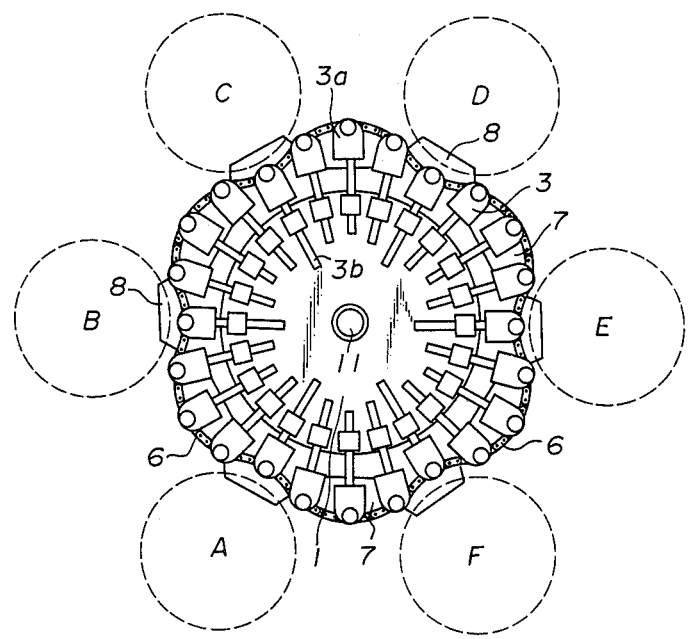
FIG. 3 is an explanatory view of one embodiment to which the constant speed conveyor unit of the present invention is applied in which the portions represented by reference numerals A, B, C, D, E and F show the locations of means for various kinds of working or production processes to be assembled with the constant speed conveyor apparatus of the present invention.

In FIG. 3, an article feeding unit is mounted in a region A, whilst an article delivery unit is disposed in a region F. In regions designated by reference characters B, C, D and E, various kinds of processing units for processing the articles to be conveyed are disposed. The processing units include for example content charging units, cappers, sealers, printing units, labelling units or the like. For the purpose of charging of contents, charging units for filling several kinds of components may be installed in the regions B to E, whilst for multi-colour printing purpose, printing units adapted to print the article to be conveyed in multiple colours in stepped manner may be disposed in the abovementioned regions.

In other words, if for example charging units for charging of materials into each of the articles being conveyed are disposed in the regions B, C, D and E, it is possible to make continuous processing flow in a multi-material charging line. Whilst, if rotary printing units are located in the same regions and a constant-speed conveyor unit is provided, it becomes possible to carry out a continuous multi-colour printing process thereby printing articles in multi-colour in stepwise manner.

Further, different kinds of processing units can be disposed relative to the constant-speed conveyor unit. For example, by locating printing units in the regions B and C and disposing sealer units in the regions D and E, a complex continuous working process can be obtained.

According to the constant-speed conveyor apparatus of the present invention, articles to be processed can be conveyed along a conveying locus or path of a predetermined irregular shape, and so the space required for the installation thereof is very small and working or production processes can be combined in a continuous flow.

Therefore, the present invention is very useful for automation of processing operations and for efficient utilization of the space in factories, and its effect is outstanding in the technical and economical aspects.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for conveying articles along a conveying locus or path of a predetermined path comprising:
   a rotary disk having a plurality of bearings mounted on the outer periphery thereof and having a first rotating shaft for rotating said disk;
   a plurality of article support means each including an arm, a frame for holding said article and a connecting member;
   a freely rotatable shaft mounted on each one of said bearings, said arm of said article support means being arranged to be slidably fitted into each respective rotatable shaft;
   a conveyor means arranged to be moved along a predetermined locus controlled by inner and outer guides;
   said connecting member being connected to said conveyor;
   a sprocket means having a second rotating shaft and adapted to drive said conveyor; and
   said first rotating shaft of said rotary disk being arranged to rotate in synchronism with said second rotating shaft of said sprocket means.

2. An apparatus for conveying articles as in claim 1, wherein said conveyor means is a conveyor chain.

3. An apparatus for conveying articles as in claim 1, wherein said connecting member is a pin means adapted to be rotatably fitted into said conveyor means.

* * * * *